Oct. 23, 1956     O. NEISS     2,768,316
PERMANENT MAGNETIC COUPLINGS
Filed Jan. 21, 1953

Inventor:
OSKAR NEISS
BY:

# United States Patent Office 2,768,316
Patented Oct. 23, 1956

2,768,316

PERMANENT MAGNETIC COUPLINGS

Oskar Neiss, Hamburg-Volksdorf, Germany

Application January 21, 1953, Serial No. 332,279

Claims priority, application Germany January 21, 1952

6 Claims. (Cl. 310—95)

The invention relates to permanent magnetic couplings with extraordinary favourable starting qualities particularly suitable for short-circuit rotor motors for which it is desirable not to load the motor before it has reached its nominal speed.

Known magnetic couplings in general have two electromagnetic energized pole faces which attract each other and complete the process of coupling after the electric circuit has been closed.

According to the present invention, however, there is arranged a permanent magnetic coupling in which each of the coupling halves is provided with a wreath of magnets, the said wreathes are alternatively provided with north and south poles having the same pole pitch. Preferably the magnets of the wreaths of magnets consist of an inner core which is separated by a non-magnetic parting line from a surrounding magnetic return path.

According to a further embodiment of the invention the wreath of magnets of the driving coupling half in respect to the stationary wreath of magnet of the driven coupling half is arranged in such a way that it may be radially displaced by centrifugal forces and be reset by a resetting spring.

Especially the coupling halves consist of a magnetic material in which for producing wreaths of magnets permanent iron cores are inserted by interposing layers of non-magnetic material, wherein the coupling halves form the magnetic return path themselves. To increase the magnetic forces the wreaths of magnets may be embedded in a magnetic liquid, e. g. a mixture of oil and powdered iron or ferrocarbonyl.

Two exemplified embodiments of the invention are illustrated in the accompanying drawings, wherein.

Figure 1:
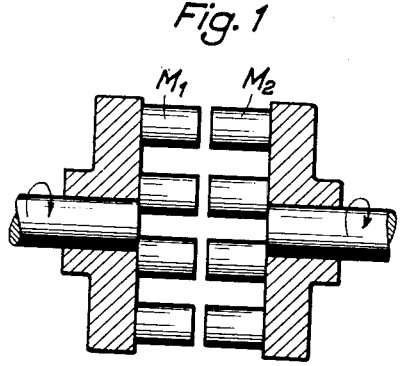
Fig. 1 is a sectional view of a coupling.
Figure 6:
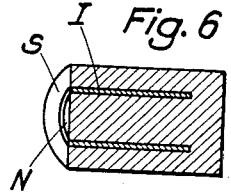
Fig. 6 is a sectional view of a single magnet.

The coupling half $M_1$ shown in Fig. 1 is provided at its circumference with a number of magnets as they are illustrated in Fig. 6. The coupling half $M_2$ likewise is provided with such a wreath of magnets. The pole faces of both coupling halves are arranged likewise and are alternatively provided with north and south poles having the same pole pitch. Each single magnet consists of an inner core N (e. g. a north pole) which is separated by a non-magnetic parting line I from a surrounding magnetic return path S (e. g. the corresponding south pole), so that a magnetic field may only be developed at the pole faces of the magnets.

If the two corresponding magnets are in such a position that they have a common axis, repulsion between both coupling halves is caused. Therefore no torque can be transmitted by the coupling. However, as soon as there is a displacement of the geometric axes of the corresponding magnetic systems a change of the repulsive forces into attractive forces is caused. This happens e. g. if one of the coupling halves is fixed to a motor and therefore acts as a driving element whilst the other coupling half is a driven one.

For starting operations of e. g. short-circuit rotor motors it is desirable not to load the motor before it has reached its maximum speed, after about 1 to 2 revolutions.

Figure 2:
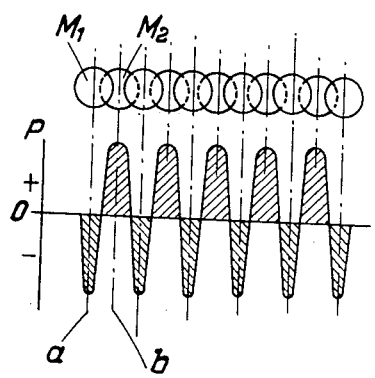
Figs. 2 and 3 are explanatory diagrams of magnetic forces.
Figure 3:
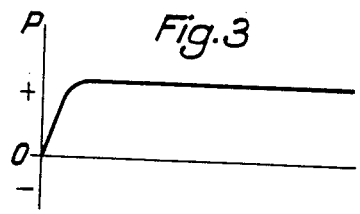

The purpose of the present invention is to attain a slip between the two coupling halves whilst the motor is accelerating. This is performed as follows: When the motor is accelerating the driven coupling half tries to remain at rest. By this inertia the wreath of magnets $M_1$ continuously changes its position in respect to the wreath of magnets $M_2$. The magnetic forces of this state of process are illustrated in the diagram of Fig. 2. The prevailing magnetic forces between the two coupling halves are oscillating from plus to minus, at the rate of the slip frequency. In these oscillations the positive (attractive) forces $b$ surpass the negative (repulsive) forces $a$. Therefore the driven part of the coupling gradually will develop full speed too after it has overcome its inertia. If there is no more relative motion between the two coupling halves, the geometric axes between the element $M_1$—$M_2$ are displaced in such a way that there is nothing but attraction between the two wreaths of magnets. This terminal state of the starting process is illustrated in the diagram of Fig. 3.

Figure 4:
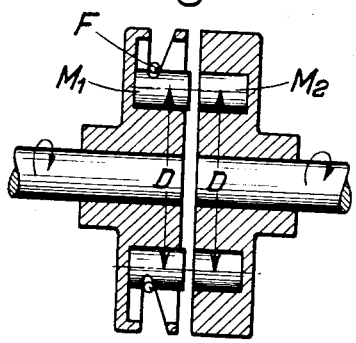
Figs. 4 and 5 show a further example of an embodiment of the invention.
Figure 5:
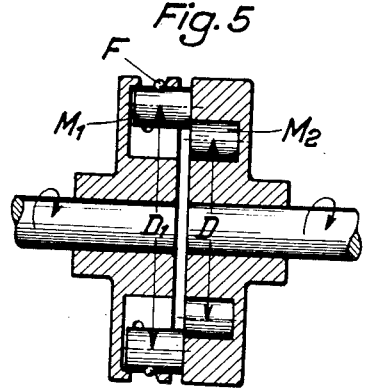

In the further embodiment of the invention shown in Figs. 4 and 5 the coupling half $M_2$ is provided with a stationary wreath of magnets, whilst the coupling half $M_1$ has got a wreath of magnets which is subjected to centrifugal forces. If the coupling element $M_1$ is connected with the driving motor during the starting process the wreath of magnets $M_1$ is transferred by centrifugal forces from the diameter D to the diameter $D_1$, shown in Fig. 5. By this changement of diameter the geometric axes of the two magnetic systems are displaced in respect to one another and an attraction of the two coupling halves is produced. When the magnetic system is at rest a spring ring F holds the wreath of magnets $M_1$ in its resting position in which both of the magnetic systems have a common geometric axis. Therefore in the resting position no attraction takes place.

According to the invention the permanent magnets which form the wreaths $M_1$ and $M_2$ may be arranged in such a way that the magnetic return path S of each magnetic core N is formed by the iron coupling flange within which magnetically non-conducting or poorly conducting layers I are interposed between the body of the coupling flange and the lateral walls of the magnetic cores.

According to a further object of the invention it is possible not to have the magnetic systems working in air but in a magnetic liquid, e. g. by bringing in a mixture of oil and powdered iron or ferrocarbonyl into the air gap.

Having now particularly described my invention, what I claim is:

1. A magnetic slip coupling for accelerating a driven member from a standstill comprising, in combination, a coaxial rotary drive member having a driving portion; a rotary driven member having a driven portion facing said drive portion; a set of first magnets on said driving portion; and a set of second magnets on said driven portion, each of said first and second magnets including a first pole piece of a given polarity and a second pole piece of the opposite polarity, enveloping said first pole piece and having a free pole face, said pole faces of said first magnets facing said pole faces of said second magnets so that the magnetic flux between said pole faces of said first magnets and said pole faces of said second magnets alternately repels said driving and driven portions for certain periods with a tangential force and attracts said driving and driven portions for longer periods with a tangential driving force while said drive member rotates relative to said driven member.

2. A magnetic slip coupling for accelerating a driven member from a standstill comprising, in combination, a coaxial rotary drive member having a driving portion; a rotary driven member having a driven portion facing said drive portion; a set of first permanent magnets on said driving portion; and a set of second permanent magnets on said driven portion, each of said first and second permanent magnets including a first pole piece of a given polarity and a second hollow pole piece of the opposite polarity concentric with and enveloping said first pole piece and having a free pole face at one end thereof, said pole faces of said first magnets facing said pole faces of said second magnets so that the magnetic flux between said pole faces of said first magnets and said pole faces of said second magnets alternately repels said driving and driven portions for certain periods with a tangential force and attracts said driving and driven portions for longer periods with a tangential driving force while said drive member rotates relative to said driven member.

3. A magnetic slip coupling for accelerating a driven member from a standstill comprising, in combination, a coaxial rotary drive member having a driving portion; a rotary driven member having a driven portion facing said drive portion; a set of first magnets on said driving portion equally spaced in a circle; and a set of second magnets on said driven portion equally spaced in a circle, each of said first and second magnets including a first pole piece of a given polarity and a second pole piece of the opposite polarity, enveloping said first pole piece and having a free pole face, said pole faces of said first magnets facing said pole faces of said second magnets, said second pole pieces of said magnets of each of said sets of magnets being alternately of different polarity so that the magnetic flux between said pole faces of said first magnets and said pole faces of said second magnets alternately repels said driving and driven portions for certain periods with a tangential force and attracts said driving and driven portions for longer periods with a tangential driving force while said drive member rotates relative to said driven member.

4. A magnetic slip coupling for accelerating a driven member from a standstill comprising, in combination, a coaxial rotary drive member having a driving portion; a rotary driven member having a driven portion facing said drive portion; a set of first permanent magnets on said driving portion equally spaced in a circle; and a set of second permanent magnets on said driven portion equally spaced in a circle, each of said first and second permanent magnets including a first pole piece of a given polarity and a second hollow pole piece of the opposite polarity concentric with and enveloping said first pole piece and having a free pole face at one end thereof, said pole faces of said first magnets facing said pole faces of said second magnets, said second pole pieces of said magnets of each of said sets of magnets being alternately of different polarity so that the magnetic flux between said pole faces of said first magnets and said pole faces of said second magnets alternately repels said driving and driven portions for certain periods with a tangential force and attracts said driving and driven portions for longer periods with a tangential driving force while said drive member rotates relative to said driven member.

5. A magnetic slip coupling for accelerating a driven member from a standstill comprising, in combination, a coaxial rotary drive member having a driving portion; a rotary driven member having a driven portion facing said drive portion; a set of first magnets on said driving portion; and a set of second magnets on said driven portion, each of said first and second magnets including a first pole piece of a given polarity and a second pole piece of the opposite polarity, enveloping said first pole piece and having a free pole face, said pole faces of said first magnets facing said pole faces of said second magnets so that the magnetic flux between said pole faces of said first magnets and said pole faces of said second magnets alternately repels said driving and driven portions for certain periods with a tangential force and attracts said driving and driven portions for longer periods with a tangential driving force while said drive member rotates relative to said driven member; means mounted on said driving portion of said drive member and supporting said first magnets for movement in radial direction from an inner position located opposite said second magnets to an outer position so that due to centrifugal forces said first magnets move to said outer position at a predetermined rotary speed of said drive member and are located outwardly of said second magnets whereby the magnetic flux between said first magnets in said outer position and said second magnets attracts said driving and driven portions magnetically to couple said driven member with said drive member; and resilient means connected to said first magnets and urging the same to said inner position.

6. A magnetic slip coupling for accelerating a driven member from a standstill comprising, in combination, a coaxial rotary drive member having a driving portion; a rotary driven member having a driven portion facing said drive portion; a set of first permanent magnets on said driving portion equally spaced in a circle; a set of second permanent magnets on said driven portion equally spaced in a circle, each of said first and second permanent magnets including a first pole piece of a given polarity and a second hollow pole piece of the opposite polarity concentric with and enveloping said first pole piece and having a free pole face at one end thereof, said pole faces of said first magnets facing said pole faces of said second magnets, said second pole pieces of said magnets of each of said sets of magnets being alternately of different polarity so that the magnetic flux between said pole faces of said first magnets and said pole faces of said second magnets alternately repels said driving and driven portions for certain periods with a tangential force and attracts said driving and driven portions for longer periods with a tangential driving force while said drive member rotates relative to said driven member; means mounted on said driving portion of said drive member and supporting said first magnets for movement in radial and axial directions from an inner position located opposite said second magnets and spaced from the same a first distance in axial direction to an outer position spaced a shorter axial distance from said second magnets so that due to centrifugal forces said first magnets move to said outer position at a predetermined rotary speed of said drive member and are located outwardly of said second magnets whereby the magnetic flux between said first magnets in said outer position and said second magnets attracts said driving and driven portions magnetically to couple said driven member with said drive member; and resilient means connected to said first magnets and urging the same to said inner position.

References Cited in the file of this patent

UNITED STATES PATENTS

| | | |
|---|---|---|
| 1,962,659 | Kautz | June 12, 1934 |
| 2,182,469 | Davis | Dec. 5, 1939 |
| 2,255,420 | Graham | Sept. 9, 1941 |
| 2,300,778 | Cornwell | Nov. 3, 1942 |
| 2,437,871 | Wood | Mar. 16, 1948 |
| 2,460,015 | Jones | Jan. 25, 1949 |
| 2,481,172 | Staggs | Sept. 6, 1949 |
| 2,575,360 | Rabinow | Nov. 20, 1951 |
| 2,638,558 | Rankin | May 12, 1953 |
| 2,673,377 | Gaugler | Mar. 30, 1954 |

FOREIGN PATENTS

| | | |
|---|---|---|
| 545,731 | Germany | Mar. 4, 1932 |
| 816,715 | Germany | Oct. 11, 1951 |